United States Patent
Schramm

(12) 
(10) Patent No.: US 6,497,431 B1
(45) Date of Patent: Dec. 24, 2002

(54) ADAPTIVE RESTRAINT SYSTEM

(76) Inventor: Michael R. Schramm, 350 W. 2000 South, Perry, UT (US) 84302

( * ) Notice: Subject to any disclaimer, the term of this patent is extended or adjusted under 35 U.S.C. 154(b) by 0 days.

(21) Appl. No.: 09/819,463

(22) Filed: Mar. 27, 2001

Related U.S. Application Data

(63) Continuation-in-part of application No. 08/890,522, filed on Jul. 9, 1997, now abandoned.

(51) Int. Cl.[7] .............................................. B60R 21/26
(52) U.S. Cl. ...................................... 280/736; 280/739
(58) Field of Search ................................ 280/739, 738, 280/736, 742, 735

(56) References Cited

U.S. PATENT DOCUMENTS

| | | | |
|---|---|---|---|
| 5,366,242 A | * 11/1994 | Faigle et al. | 280/739 |
| 5,707,078 A | 1/1998 | Swanberg et al. | 280/739 |
| 5,743,558 A | 4/1998 | Seymour | 280/739 |
| 5,853,192 A | 12/1998 | Sikorski et al. | 280/739 |
| 5,918,901 A | 7/1999 | Johnson et al. | 280/739 |
| 6,039,346 A | 3/2000 | Ryan et al. | 280/736 |
| 6,039,348 A | 3/2000 | Niederman et al. | 280/741 |
| 6,068,288 A | 5/2000 | Karolek et al. | 280/735 |
| 6,109,647 A | * 8/2000 | Akaba et al. | 280/735 |
| 6,123,358 A | 9/2000 | Ryan et al. | 280/739 |
| 6,158,770 A | 12/2000 | Ryan et al. | 280/736 |
| 6,161,866 A | 12/2000 | Ryan et al. | 280/736 |
| 6,196,582 B1 | 3/2001 | Sparkman et al. | 280/736 |
| 6,203,061 B1 | 3/2001 | Niederman et al. | 280/736 |
| 6,213,502 B1 | 4/2001 | Ryan et al. | 280/736 |
| 6,227,567 B1 | 5/2001 | Ross | 280/742 |
| 6,241,279 B1 | * 6/2001 | Ochiai | 280/739 |
| 6,247,726 B1 | 6/2001 | Ryan | 280/739 |
| 6,273,463 B1 | 8/2001 | Peterson et al. | 280/739 |
| 6,357,791 B1 | * 3/2002 | Faigle et al. | 280/436 |
| 2001/0024031 A1 | * 9/2001 | Ochiai | 280/732 |

FOREIGN PATENT DOCUMENTS

| | | | |
|---|---|---|---|
| JP | 3-32957 | * | 2/1991 |
| JP | 11-268605 | * | 10/1999 |

* cited by examiner

*Primary Examiner*—Peter C. English

(57) ABSTRACT

The adaptive airbag system is an invention that because of its unique design, will adjust an overload valve opening resistance force such that the airbag is capable of more aggressive deployment in response to a more aggressive requirement indication and such that the airbag is capable of less aggressive deployment in response to a less aggressive requirement indication. Because the adaptive airbag system employs an inflator enclosing adjustable reaction canister rather than a uniquely designed inflator per application, the invention provides for greater economies of scale in inflator production. The invention also provides for readily reprogrammable deployment parameters post airbag to vehicle installation. The invention is principally intended to avoid dangerous overly aggressive deployments such as for children and small statured adults, without sacrificing sufficiently aggressive deployments such as for larger or non seatbelted adults.

1 Claim, 9 Drawing Sheets

ADAPTIVE RESTRAINT SYSTEM

This application is a continuation, in part of co-pending application Ser. No. 08/890,522 filed Jul. 9, 1997, now abandoned. The benefit of the filing date of this earlier filed application is claimed under 35 U.S.C. §120.

SUMMARY OF THE INVENTION

The present invention relates to an improved airbag system which will, based on a predetermined input, adjust the deployment potential of the airbag appropriate for the occasion. In general, the system, by adjusting the flow path from the inflator to a non-airbag inflating escape path, will allow for a more aggressive deployment based on input such as recognition of a larger or unbelted occupant and will allow for a less aggressive deployment based on input such as recognition of a smaller or belted occupant. Because the system automatically adjusts the flow paths of a fully powered inflator rather than requiring a uniquely designed inflator per application, much more standardized inflators can be used for a wide variety of vehicles to achieve a greater economy of scale. In order to adapt the improved airbag system to a different vehicle, rather than any mechanical or geometrical differences, the algorithms of the controlling electronics would merely be modified to incorporate new variables such as vehicle structure stiffness, length of crumple zone, airbag volume, airbag vehicle location, airbag to occupant distance, etc. Further, should for any reason, such as the gathering and processing of more crash statistics, the deployment rate potential needs to be changed retroactively, the change would merely require modifying the controlling electronics deployment parameters such as by a software upgrade.

In a preferred embodiment of the present invention, the adaptive airbag system comprises an airbag module having an airbag inflator, an airbag inflator encasing reaction canister, and an airbag. The reaction canister incorporates an overload valve comprising a spring and two end caps that are coupled to a spring compressor. The overload valve is ported such that inflation fluid that passes through the overload valve, is allowed to pass harmlessly through the vehicle firewall and to the atmosphere outside of the vehicle cockpit, or into some other harmless location. The compressive load on the spring and valve, much as an automatically focusing Further, once designed and installed in a vehicle, should one desire to change the inflator deployment rate, the existing inflator would have to be physically replaced with another inflator of the desired deployment rate. Additionally, because of the increased number of activating components relied upon, it is believed that the reliability and repeatability of inflators of the above described type is inherently reduced. Thus although these types of inflators are an improvement over that which has heretofore been available, they add considerable cost to the airbag system, they require a uniquely designed inflator for each significantly different vehicle in which they would be installed, and they are limited in their amount of adjustability.

Other methods used to adaptively adjust an airbag are found in U.S. Pat. Nos. 5,707,078 and 6,068,288. U.S. Pat. Nos. 5,707,078, and 6,068,288 are expressly incorporated herein by reference. camera lens that adjusts to changing fields of view, continuously adjusts as required to incoming signals. In response to a requirement for a less aggressive deployment, the compressor adjusts so as to apply a lesser compressive load to the spring and consequently to the valve such that a lower reaction canister air pressure will cause the valve to open. In response to a requirement for a more aggressive deployment, the compressor adjusts so as to apply a greater compressive load to the spring and consequently to the valve such that a higher reaction canister air pressure is required to cause the valve to open. In this fashion, the adaptive airbag system is adjustable from the entire gas flow being directed to the airbag, to the entire gas flow being diverted from the airbag in the case where the an airbag breakout force is less than the force required to open the overload valve. This embodiment has the advantage of compensating for a higher than intended/desired inflation pressure/force by reactively allowing the overload valve to open a greater amount. Further this embodiment has the advantage of compensating for an inflation pressure/force that drops off too rapidly by closing completely or partially during inflation gas deployment. Such advantage can provide for a better deployment pressure curve over the entire duration of inflation gas deployment. In order to avoid compressor fluttering, the compressor constantly adjusting to the most minute sensed change in deployment requirement, and to increase the life of the compressor and valve, the controlling electronics provide dead zones in the ranges of inputs that cause valve adjustment. For example, the compressor could adjust the valve so as to reduce the potential gas flow to the airbag upon the sensing of a weight on the vehicle seat of less than 100 pounds, and yet the compressor would not increase the potential gas flow to the airbag until the sensing of a weight on the vehicle seat of more than 105 pounds. Thus once adjusted to a load of 100 pounds, the compressor would not respond to minor fluctuations in seat loading over 100 pounds but less than 105 pounds until after experiencing a load of 105 pounds or greater or less than 100 pounds.

Thus it is an object of this invention to provide an adaptive airbag system that automatically adjusts to a required degree of deployment.

It is a further object of this invention to provide an adaptive airbag system that compensates for performance variability in an inflation device.

It is a further object of this invention to provide an adaptive airbag system that provides the situation appropriate amount of inflation fluid to the airbag and allows the remainder to the inflation fluid to escape outside of a vehicle cockpit, thus avoiding any unnecessary inflation fluid inhalation by a vehicle occupant.

It is a further object of this invention to provide an adaptive airbag system having deployment parameters that are retroactively redefineable by modifying the electronic algorithms that control airbag deployment.

BRIEF DESCRIPTION OF DRAWINGS

The objects and many attendant advantages of this invention will be readily appreciated and become readily apparent as the same becomes better understood by reference to the following detailed description, when considered in conjunction with the accompanying drawings and in which like reference numerals designate like parts throughout the figures thereof and wherein:

FIG. 1 is shown rotated 90 degrees counterclockwise to facilitate a larger scale view.

FIG. 3 is shown rotated 90 degrees counterclockwise to facilitate a larger scale view.

FIG. 5 is shown rotated 90 degrees counterclockwise to facilitate a larger scale view.

DETAILED DESCRIPTION OF THE PREFERRED EMBODIMENT

Figure 1:
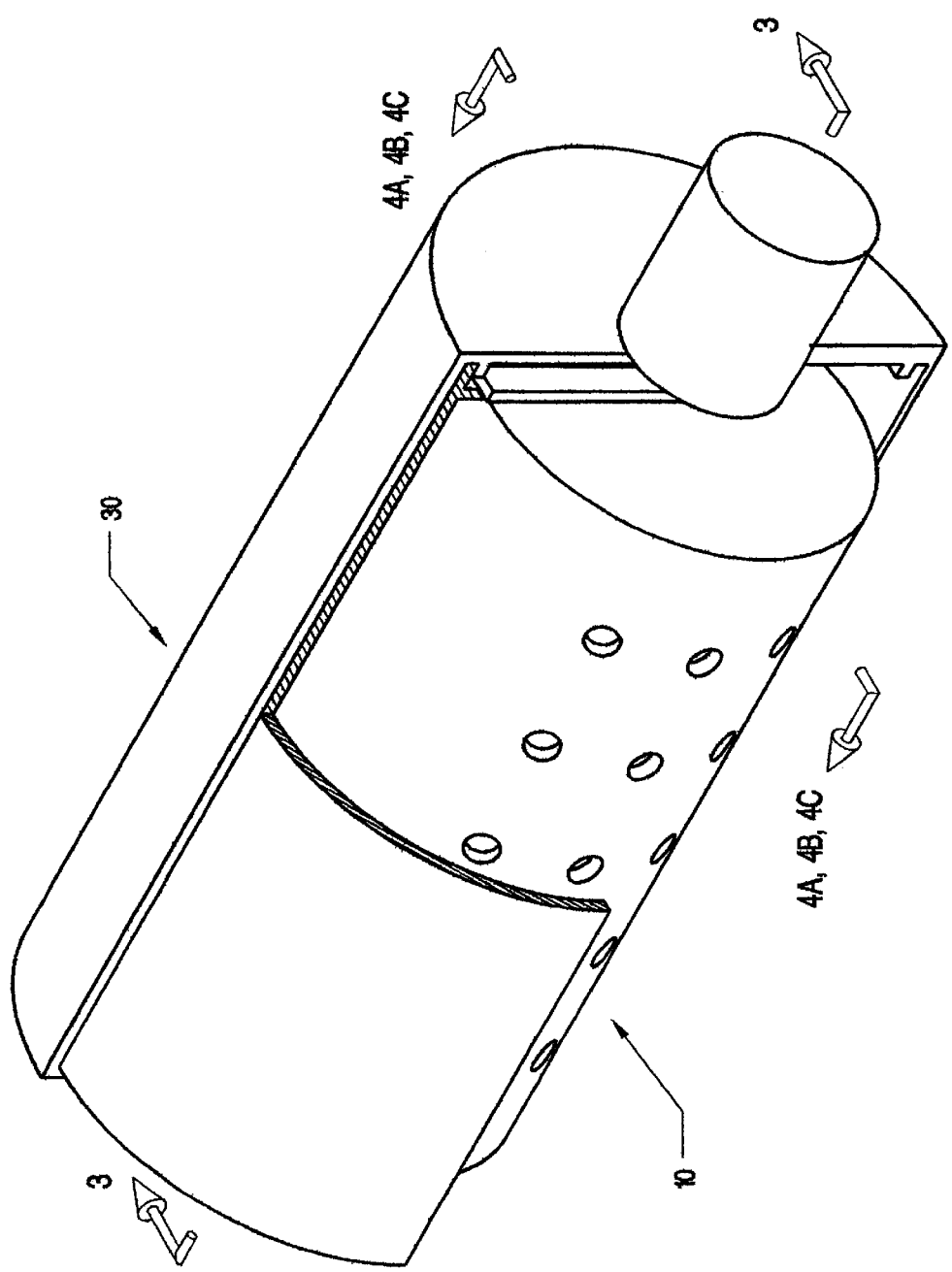
FIG. 1 is an isometric view of one embodiment of the adaptive restraint system assembly. The bag side reaction canister half, airbag, and airbag bracket are not shown. The slidable door is shown with it's front right side portion cut away.
Figure 2:
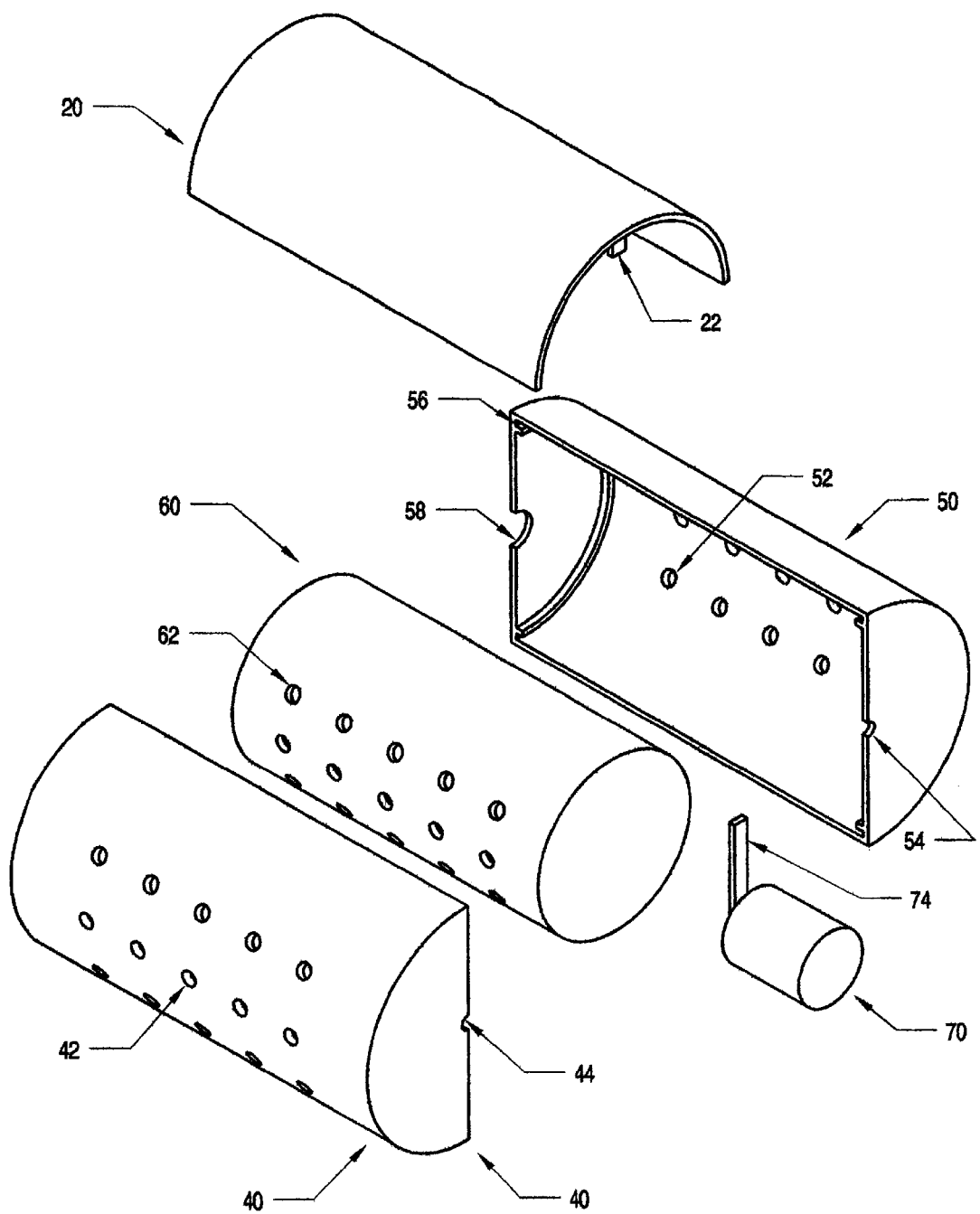
FIG. 2 is an exploded view of the embodiment of FIG. 1. The airbag and airbag bracket are not shown.
Figure 3:
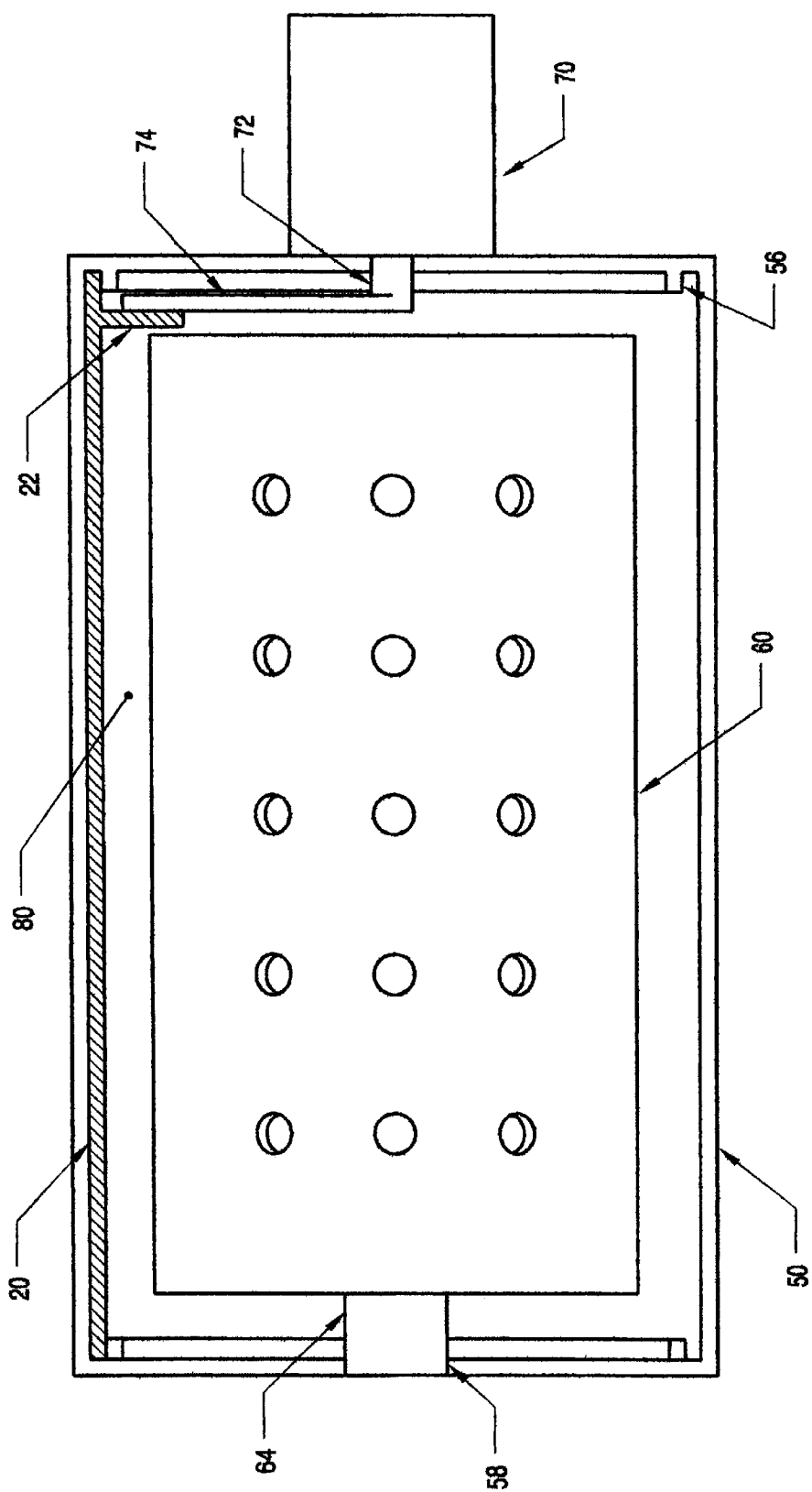
FIG. 3 is a combination front section view/front orthographic view of the embodiment of FIG. 1 taken at near the center of the assembly as noted by the section line 3—3 in FIG. 1. The bag side reaction canister half, airbag, and airbag bracket are not shown. The slidable door is shown with the front half cut away.

In order to facilitate the understanding of the present invention in reviewing the drawings accompanying the specification, a feature list is provided below. It is noted that like features are like numbered throughout all of the figures.

FEATURE TABLE

| Number | Feature |
| --- | --- |
| 10 | Adaptable restraint system in general |
| 20 | Slidable door in general |

-continued

FEATURE TABLE

| Number | Feature |
| --- | --- |
| 22 | Slidable door connecting arm |
| 30 | Reaction canister in general |
| 40 | Reaction canister front half |
| 42 | Airbag directed reaction canister port hole |
| 44 | Stepper motor retention hole-canister front half |
| 50 | Reaction canister back half |
| 52 | Non-airbag directed reaction canister port hole |
| 54 | Stepper motor retention hole-canister back half |
| 56 | Reaction canister door retention track |
| 58 | Reaction canister inflator retention hole |
| 60 | Gas generating inflator in general |
| 62 | Inflator port hole |
| 64 | Inflator connecting stud |
| 70 | Stepper motor in general |
| 72 | Stepper motor rotatable shaft |
| 74 | Stepper motor connecting arm |
| 80 | Pressurizable space between reaction canister and inflator |
| 90 | Airbag mounting bracket in general |
| 100 | Airbag in folded position in general |
| 110 | Adaptable restraint system in general |
| 120 | Spring in general |
| 130 | Reaction canister in general |
| 140 | Reaction canister front half |
| 142 | Airbag directed reaction canister port hole |
| 144 | Non-airbag directed port hole-canister front half |
| 146 | Typical front half reaction canister valve guide |
| 150 | Reaction canister back half |
| 152 | Typical back half reaction canister valve guide |
| 154 | Non-airbag directed port hole-canister back half |
| 158 | Reaction canister inflator retention hole |
| 160 | Gas generating inflator in general |
| 162 | Inflator port hole |
| 170 | Spring compressor in general |
| 172 | Spring compressor shaft |
| 174 | Spring compressor engagement flange |
| 180 | Pressurizable space between reaction canister and inflator |
| 190 | Inflator side spring cap in general |
| 192 | Spring cap flange |
| 196 | Compressor side spring cap in general |
| 198 | Spring cap flange |

Referring now to the drawings and specifically FIGS. 1 through 4C, the one embodiment of the invention is an adaptive restraint system 10 that comprises a slidable door 20, a reaction canister 30, a gas generating inflator 60, a stepper motor 70, a reaction canister to airbag bracket 90, and an airbag 100, the combination of which define an airbag module. Reaction canister 30 comprises a front reaction canister half 40 and a back reaction canister half 50 mechanically fastened together, the fastened assembly of which defines an outer pressurizable vessel. Inflator 60 is mounted in canister 30 by the connection of inflator connecting stud 64 and canister inflator retention hole 58 such that there is pressurizable space 80 between the canister 30 and the inflator 60. Slidable door 20 is slidingly mounted within a canister door retention track 56. The actuatable assembly of slidable door 20 mounted within reaction canister 30 and being in openable and closeable relationship to airbag directed port holes 42 and non-airbag port holes 52 defines an actuatable valve. Stepper motor 70 is mounted in canister 30 by the rotatable connection of stepper motor rotatable shaft 72 and canister stepper motor retention hole 44, 54. Slideable door 20 and stepper motor 70 are rotatably connected by the mechanical connection of slideable door connection arm 22 and stepper motor connection arm 74.

Airbag mounting bracket 90 pressurizably connects canister front half 40 to airbag 100. In response to the reception of a less aggressive deployment requirement signal, stepper motor 70 actuatingly moves slidable door 20 to a greater airbag directed canister port hole 42 covered and lesser non-airbag directed canister port hole 52 covered position such as to provide a lesser potential gas flow path through airbag port holes 42 and a greater potential gas flow path through non-airbag directed canister port holes 52 similar to the orientation shown in FIG. 4B. In response to the reception of a more aggressive deployment requirement signal, the stepper motor 70 actuatingly moves slidable door 20 to a lesser airbag directed canister port hole 42 covered and greater non-airbag directed canister port hole 52 covered position such as to provide a greater potential gas flow path through airbag port holes 42 and a lesser potential gas flow path through non-airbag directed canister port holes 52 similar to the orientation shown in FIG. 4C. The adaptive airbag system, based on the appropriate input signals, is designed such that it will automatically adjust the potential gas flow to the appropriate amount for a given situation. The automatic adjustment of potential gas flow will thus avoid dangerous overly aggressive deployments, especially for children and small statured adults, without sacrificing sufficiently aggressive deployments when required such as for larger or non seatbelted adults.

Figure 4A:
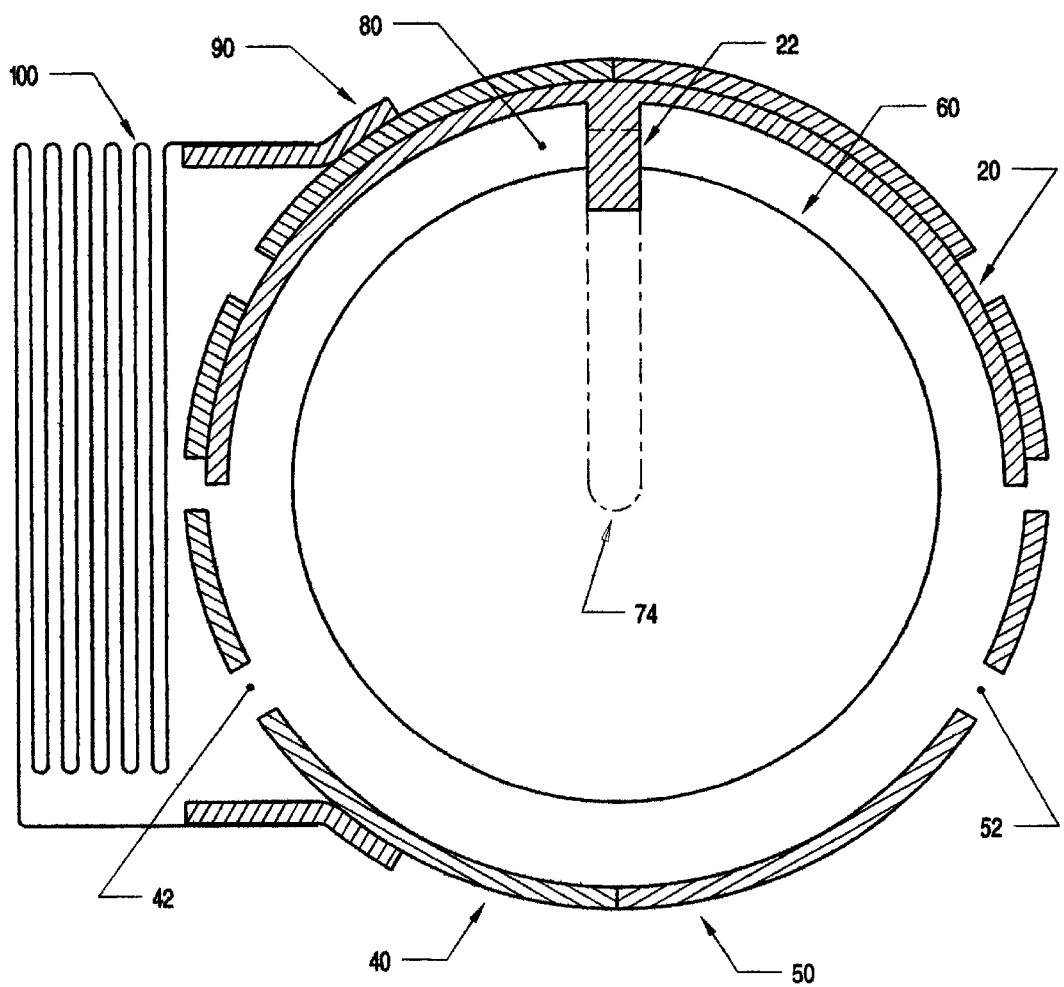
FIG. 4A is a right side section view of the embodiment of FIG. 1 taken at the slideable door connection arm interface as noted by the section line 4A—4A in FIG. 1. The inflator is shown as an orthographic view. The slideable door is in an approximate midway position. The stepper motor connector arm's foot print is shown in phantom lines.
Figure 4B:
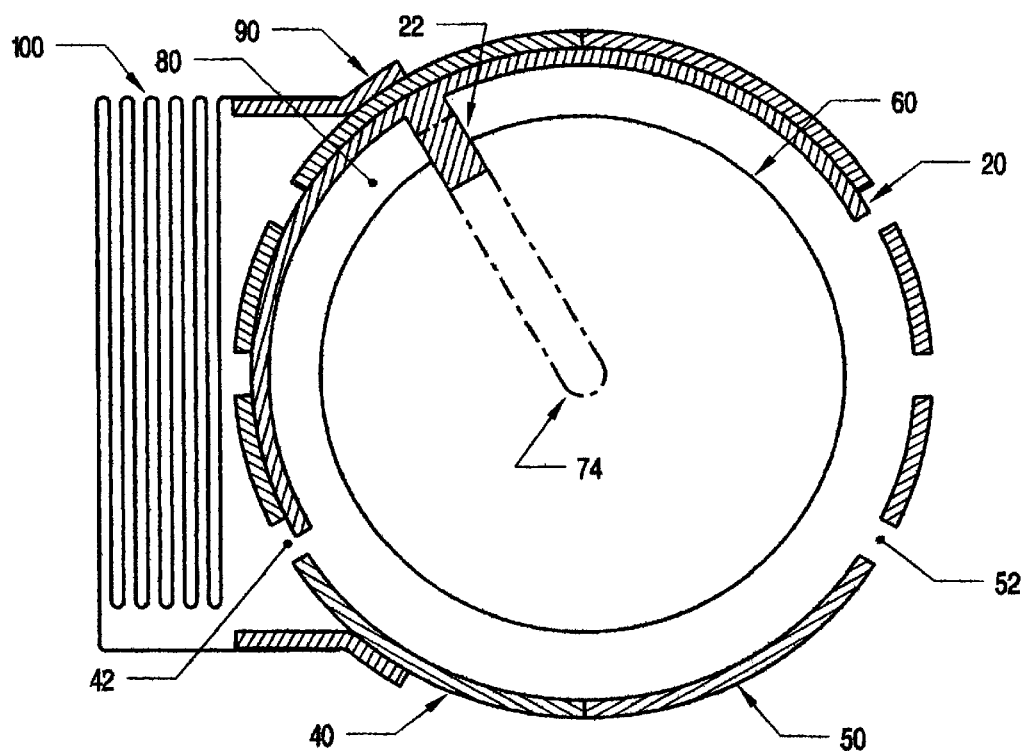
FIG. 4B is a section view taken along line 4B—4B in FIG. 1 and is identical to FIG. 4A except that the slidable door is in a mostly non-airbag directed potential gas flow path.
Figure 4C:
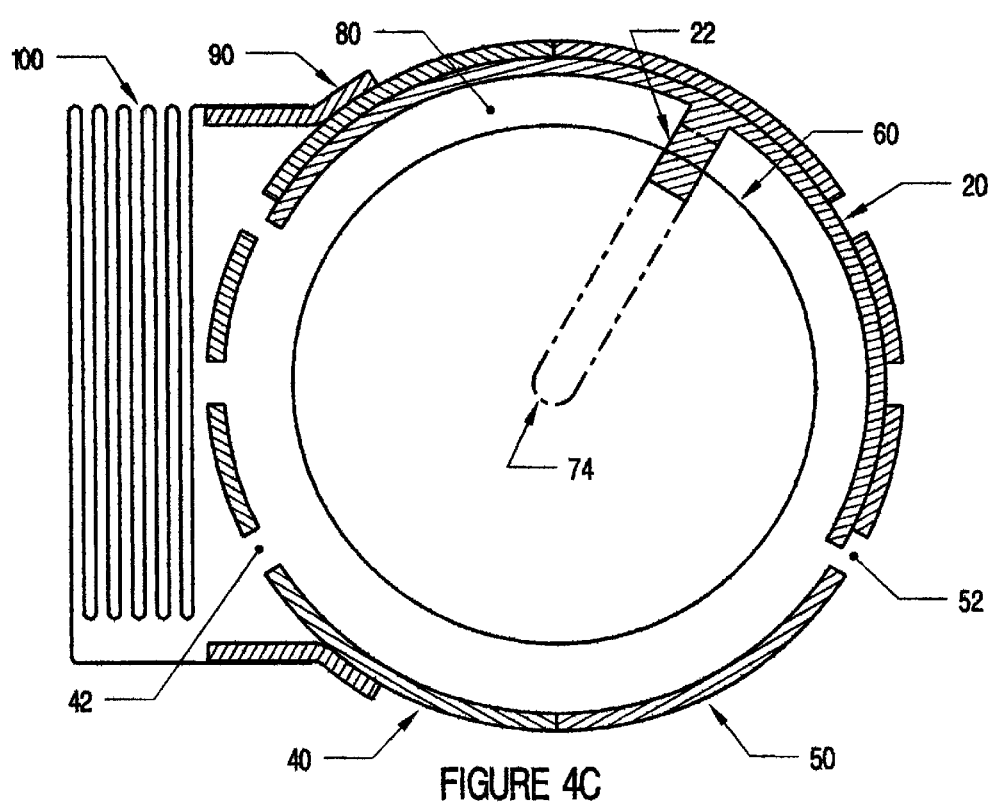
FIG. 4C is a section view taken along line 4C—4C in FIG. 1 and is identical to FIG. 4A except that the slidable door is in a mostly airbag directed potential gas flow path.
Figure 5:
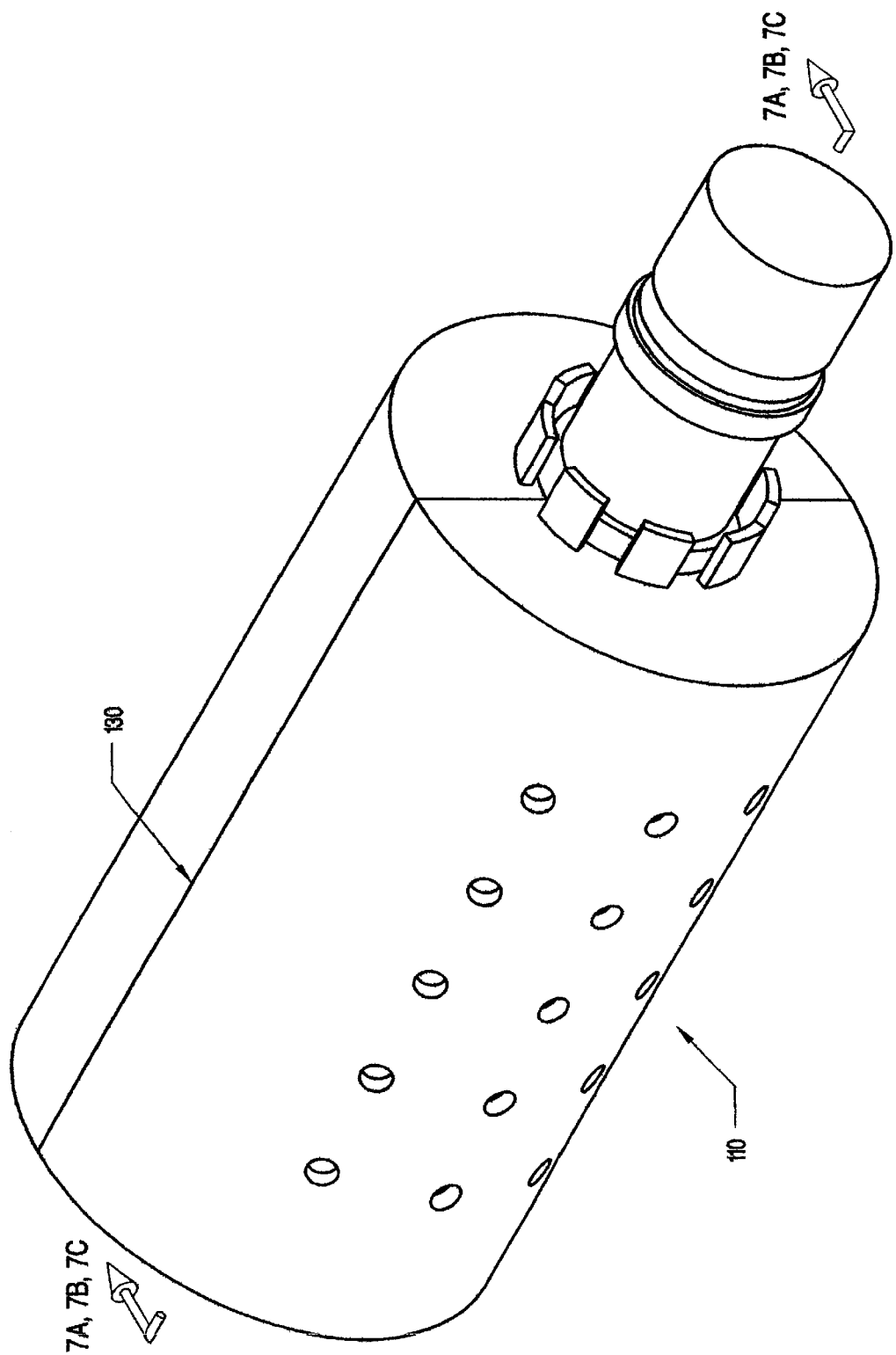
FIG. 5 is an isometric view of the preferred embodiment of the adaptive restraint system assembly. The airbag, and airbag bracket are not shown.
Figure 6:
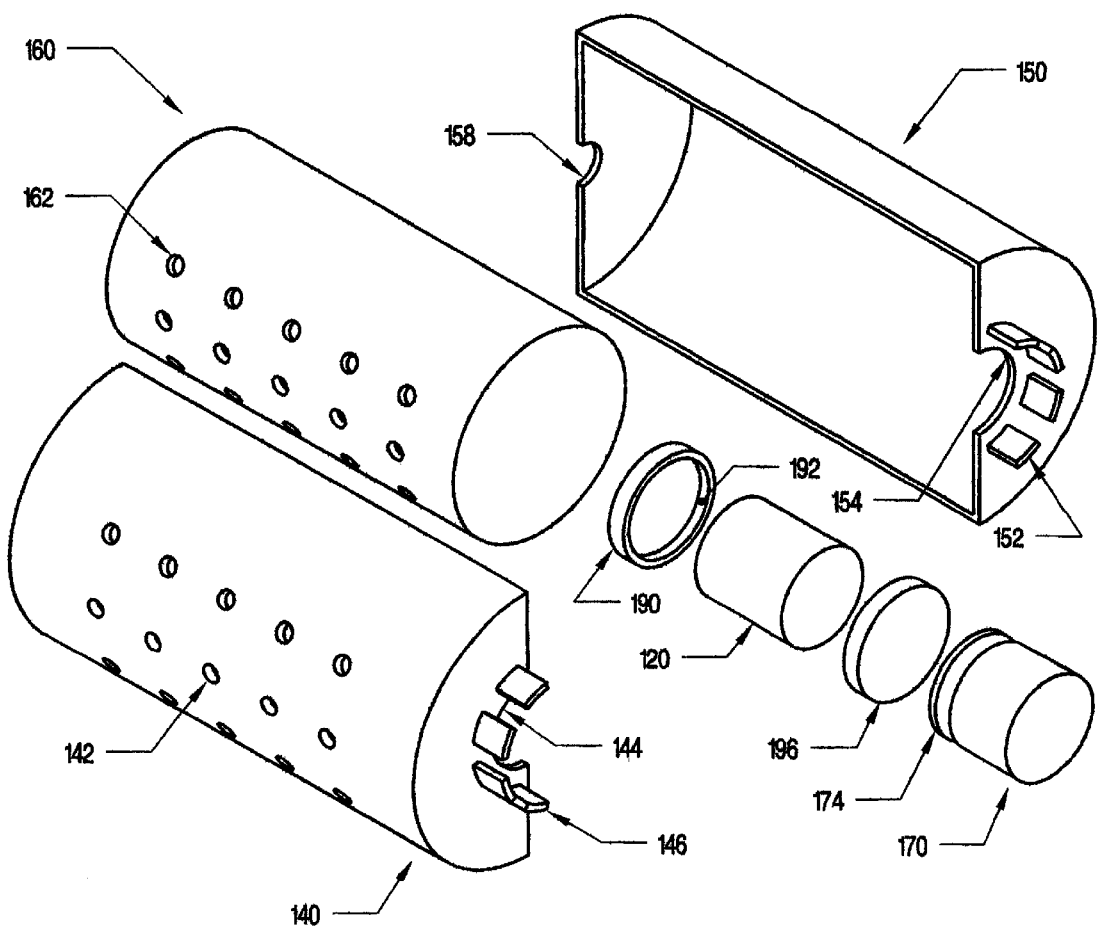
FIG. 6 is an exploded view of the preferred embodiment. The airbag and airbag bracket are not shown.
Figure 7A:
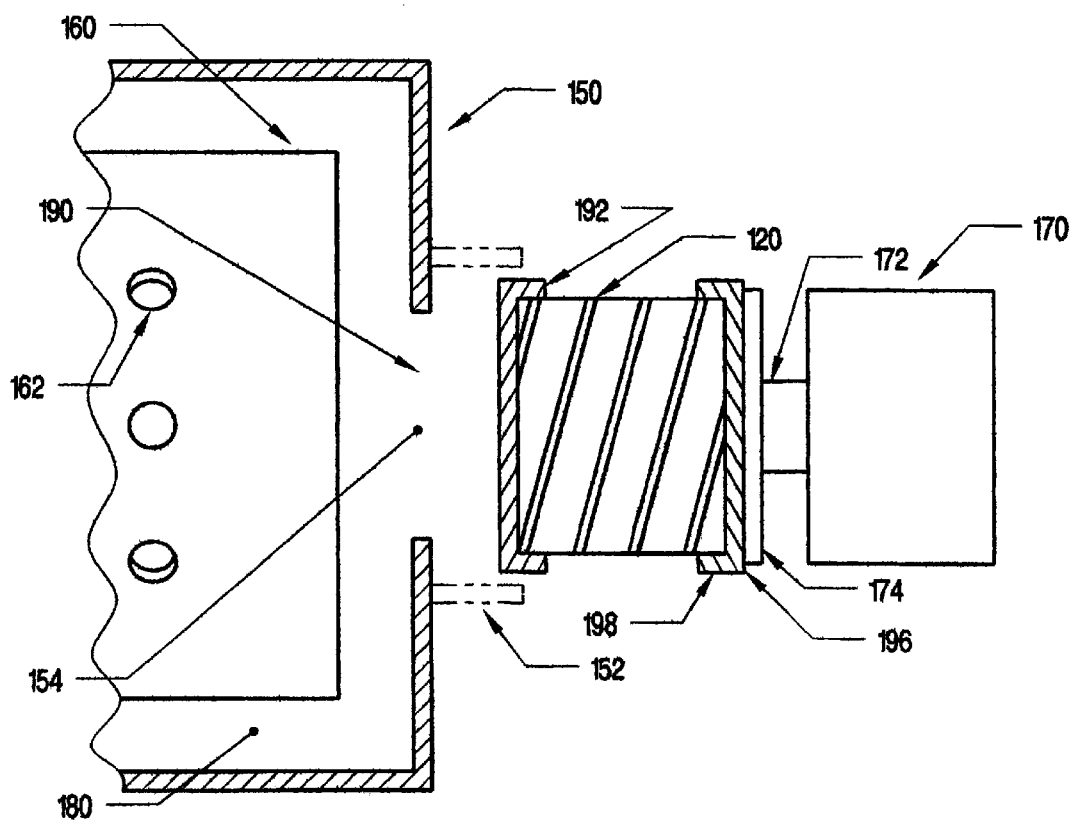
FIG. 7A is a combination front section view/front orthographic view of the preferred embodiment taken at near the center of the assembly as noted by the section line 7A—7A in FIG. 5. The bag side reaction canister half, airbag, and airbag bracket are not shown. The non-bag side reaction canister half and the valve caps are shown as if partially cut away and the valve guide is shown in phantom lines. The overflow valve is shown in an open position.
Figure 7B:
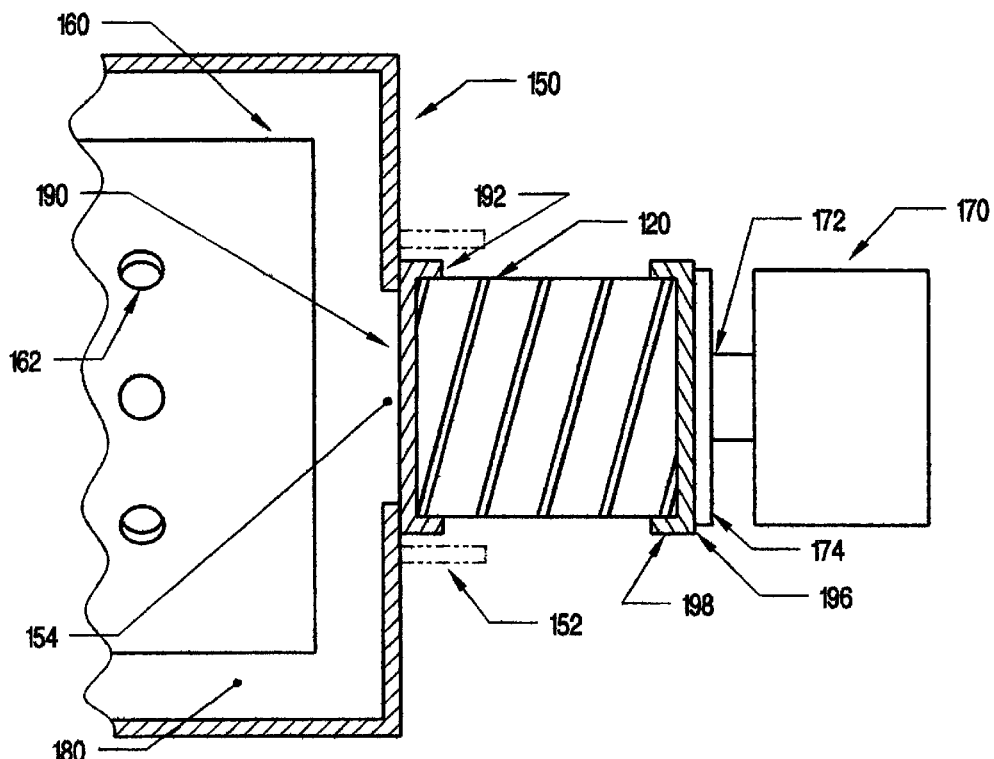
FIG. 7B is a combination front section view/front orthographic view of the preferred embodiment taken at near the center of the assembly as noted by the section line 7B—7B in FIG. 5. The bag side reaction canister half, airbag, and airbag bracket are not shown. The non-bag side reaction canister half and the valve caps are shown as if partially cut away and the valve guide is shown in phantom lines. The overflow valve is shown in a less compressed position.
Figure 7C:
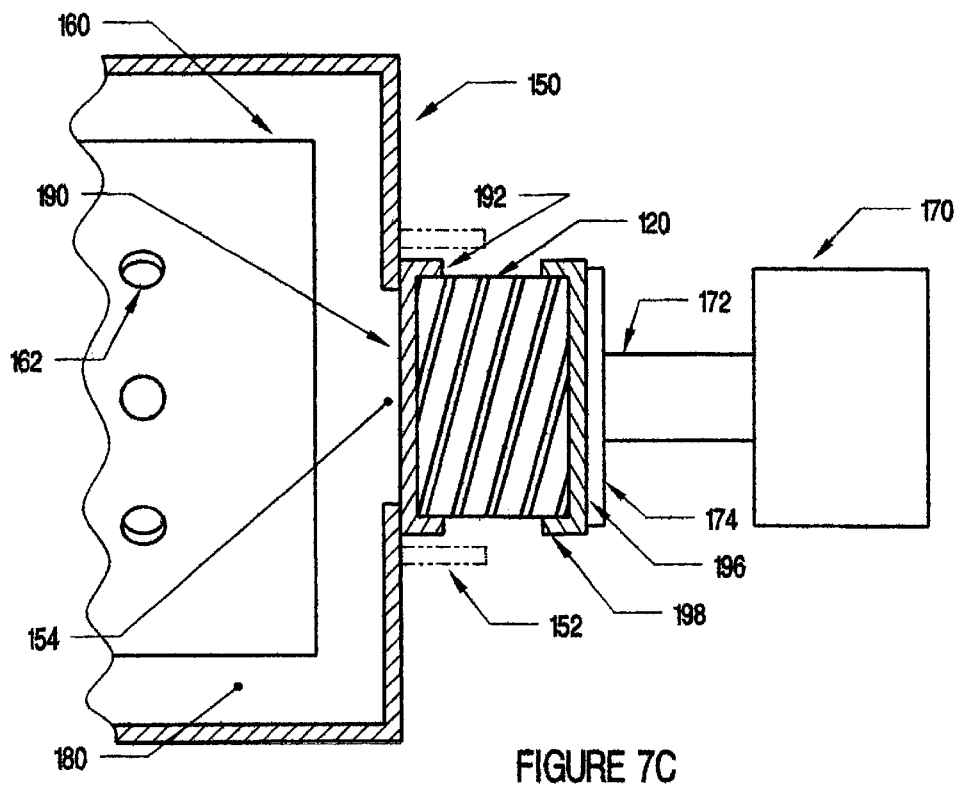
FIG. 7C is a combination front section view/front orthographic view of the preferred embodiment taken at near the center of the assembly as noted by the section line 7C—7C in FIG. 5. The bag side reaction canister half, airbag, and airbag bracket are not shown. The non-bag side reaction canister half and the valve caps are shown as if partially cut away and the valve guide is shown in phantom lines. The overflow valve is shown in a more compressed position.

Referring now to the drawings and specifically FIGS. 5 through 7C, the preferred embodiment of the invention is an adaptive restraint system 110 that comprises a spring 120, a reaction canister 130, a gas generating inflator 160, a spring compressor 170, a reaction canister to airbag bracket 90 as shown in FIG. 4A, an airbag 100 as shown in FIG. 4A, and spring caps 190 and 196, the combination of which define an airbag module. Reaction canister 130 comprises a front reaction canister half 140 and a back reaction canister half 150 mechanically fastened together, the fastened assembly of which defines an outer pressurizable vessel. Inflator 160 is mounted in canister 130 by the connection of an inflator connecting stud and canister inflator retention hole 158 such that there is pressurizable space 180 between the canister 130 and the inflator 160. Spring 120 mounts to spring caps 190 and 196 by means of spring 120 retentively engaging into spring cap flanges 192 and 198. Compressor 170 includes actuatable shaft 172 and spring engagement flange 174. Spring 120 is mounted between reaction canister 130 and spring compressor 170 and such that spring cap 190 is in sliding engagement with valve guides 146 and 152. The actuatable assembly of spring 120, spring caps 190 and 196, and spring compressor 170 mounted to reaction canister 130 and being in openable and closeable relationship to non-airbag directed port hole 144, 154 defines an actuatable valve assembly. Airbag mounting bracket 90 as shown in FIG. 4A pressurizably connects canister front half 140 to airbag 100. In response to the reception of a less aggressive deployment requirement signal, spring compressor 170 actuatingly compresses spring 120 to a less compressed position such as that shown in FIG. 7B, thus requiring a lower pressure/force to open the valve assembly. In response to the reception of a more aggressive deployment requirement signal, spring compressor 170 actuatingly compresses spring 120 to a more compressed position such as that shown in FIG. 7C, thus requiring a higher pressure/force to open the valve assembly. When the load on spring cap 190 is greater than the load on spring cap 196, spring 120 will compress and spring cap 190 will move to an open position, such as that shown in FIG. 7A, to allow inflation fluid to flow out of the non-airbag directed reaction canister port hole 144, 154. The adaptive airbag system, based on the appropriate input signals, is designed such that it will automatically adjust the potential gas flow to the appropriate amount for a given situation. The automatic adjustment of potential gas flow will thus avoid dangerous overly aggressive deployments, especially for children and small statured adults, without sacrificing sufficiently aggressive deployments when required such as for larger or non seatbelted adults.

It is also noted that the valves of both the embodiment of FIGS. 1–4C and the preferred embodiment of FIGS. 5–7C may be combined in a single adaptive restraint system.

While there is shown and described herein certain specific structure embodying the invention, it will be manifest to those skilled in the art that various modifications and rearrangements of the parts may be made without departing from the spirit and scope of the underlying inventive concept. The subject invention is not limited to the particular forms herein shown and described except insofar as indicated by the scope of the appended claims.

I claim:

1. An inflatable restraint apparatus comprising:

an inflatable device;

an inflation fluid source within a canister;

at least one first outlet formed in the canister through which inflation fluid flows into the inflatable device;

a second outlet formed in the canister through which inflation fluid is vented away from the inflatable device; and a valve controlling the flow of inflation fluid through the second outlet, the valve including a spring located between first and second caps, and a linear actuator that is generally coaxial with the spring, wherein the first cap covers the second outlet when the valve is closed, and extension of the actuator causes compression of the spring such that greater compression of the spring results in a higher inflation fluid pressure required to open the valve.

\* \* \* \* \*